United States Patent [19]

Dzjuba et al.

[11] Patent Number: 4,538,474
[45] Date of Patent: Sep. 3, 1985

[54] IMPULSE VARIABLE SPEED DEVICE

[75] Inventors: Vladimir F. Dzjuba; Vladlen L. Besedin; Boris N. Birjukov, all of Odessa, U.S.S.R.

[73] Assignee: Odessky Politekhnichesky Institut, U.S.S.R.

[21] Appl. No.: 380,746

[22] PCT Filed: Sep. 25, 1980

[86] PCT No.: PCT/SU80/00160
§ 371 Date: May 13, 1982
§ 102(e) Date: May 13, 1982

[87] PCT Pub. No.: WO82/01231
PCT Pub. Date: Apr. 15, 1982

[51] Int. Cl.³ .................. F16H 21/12; F16H 21/48; F16H 29/00; F16H 29/04
[52] U.S. Cl. .......................... 74/63; 74/116; 74/119
[58] Field of Search .............. 74/63, 116, 117, 118, 74/119, 600

[56] References Cited

U.S. PATENT DOCUMENTS

| 975,437 | 11/1910 | Kunkel | 74/600 |
| 1,141,228 | 6/1915 | Bissell | 74/116 |
| 3,073,173 | 1/1963 | Immel | 74/118 |
| 3,525,267 | 8/1970 | Hofmann | 74/63 |
| 3,561,290 | 2/1971 | Ruck | 74/394 |

FOREIGN PATENT DOCUMENTS

| 643321 | 5/1928 | France | 74/117 |
| 560758 | 9/1956 | Italy | 74/117 |
| 241183 | 6/1969 | U.S.S.R. | 74/119 |

Primary Examiner—Lawrence Staab
Assistant Examiner—Michael D. Bednarek
Attorney, Agent, or Firm—Lilling & Greenspan

[57] ABSTRACT

The impulse variable speed device comprises an input shaft (2) and output shaft (2) both axially aligned. The input shaft is kinematically connected to a mechanism for converting rotary motion of the input shaft into an oscillating motion of an intermediate link. The output shaft is connected to a mechanism for converting the oscillating motion of the intermediate link into rotary motion of the output shaft, the mechanism comprising free-wheeling clutches and of heterodirectional action kinematically connected with the intermediate link. The mechanism for converting rotary motion into an oscillating motion comprises a bow-shaped guide rod fixed on the input shaft and having the center of curvature thereof on the axis of the input and output shafts and, which center is a single center of the variable speed device. A slider is put on said guide rod for displacement along the guide rod. The slider is pivoted to one end of a lever whose axis crosses the single center of the variable speed device. The other end of the lever is fixed on the intermediate link serving as a carrier and capable of rocking with respect to the single center of the variable speed device. In addition, the carrier is a member of a mechanism for converting rocking motion into a rotary motion, which carrier being constructed as a converter having a single center, which coincides with the single center of the variable speed device.

5 Claims, 11 Drawing Figures

IMPULSE VARIABLE SPEED DEVICE

FIELD OF THE INVENTION

The present invention relates to the structure of impulse type mechanisms for steplessly adjusting the speed of rotation, namely, it relates to the structure of an impulse variable speed device.

Though providing an adequate uniformity of rotation of an output shaft, the presently known impulse variable speed devices are complicated in their design, limited in the scope of speed control, and short-lived primarily due to an intensive wear of the free-wheeling clutches. The present invention is largely directed to the solution of these problems.

DESCRIPTION OF THE PRIOR ART

Known in the art is a design of an impulse variable speed device (USSR Inventor's Certificate No. 382 866, published 23.05.73, Int. Cl.$^2$ F 16H 29/04) comprising an input shaft rigidly connected with a carrier having the form of a fork wherein an intermediate shaft extending perpendicularly to the input shaft axis is received, a mechanism for converting a rotary motion of the input shaft into an oscillating motion of the intermediate shaft, and a mechanism for converting the oscillating motion of the intermediate shaft into a rotary motion of a driven member freely mounted on the input shaft.

The mechanism for converting the rotary motion of the input shaft into the oscillating motion of the intermediate shaft is constructed in the form of a fork, one end of which is pivoted to the intermediate shaft and the other end is coupled with a segment in mesh with a worm having a flywheel at its end.

The mechanism for converting the oscillating motion of the intermediate shaft into the rotary motion of the driven member is constructed as a differential pinion attached to the intermediate shaft and in mesh with a central wheel connected with the driven member through a free-wheeling clutch.

As the input shaft rotates, the intermediate shaft oscillates with respect to the carrier. This action takes place due to an angular adjustment of the fork of the mechanism for converting the rotary motion into the oscillating motion with respect to the input shaft. As this takes place, the central wheel rotates together with the input shaft and the carrier and at the same time oscillates due to the action of the differential pinion. The sum of non-uniform rotation is transmitted from the central wheel through the free-wheeling clutch to the driven member.

The amplitude of the oscillations of the intermediate shaft and correspondingly the speed of rotation of the driven member depend on the angle of inclination of the fork of the mechanism for converting the rotary motion into the oscillating motion to the input shaft.

The uniformity of rotation of the driven member can be achieved only when several prior art devices operate in parallel, which is a difficult task structurally and results in a considerable increase in overall dimensions of such a system of devices.

The structure of an impulse variable speed device disclosed in U.S. Pat. No. 3,561,290 and published in 1971, is less complicated.

The above impulse variable speed device comprises axially aligned input and output shafts. The input shaft is kinematically connected to a mechanism for converting a rotary motion of the input shaft into an oscillating motion of an intermediate link. The output shaft is kinematically connected to a mechanism for converting the oscillating motion of the intermediate link into a rotary motion of the output shaft.

The mechanism for converting the rotary motion into the oscillating motion comprises a carrier fixed on the input shaft and a rotating half-ring, one end of which is immovable while the other end is connected to a unit for moving it along the axis of rotation of the carrier; a stationary guide connecting the immovable and movable ends of the half-ring; and an intermediate link made of rods arranged in parallel relationship to the axis of rotation of the carrier and provided with racks in mesh with spur gears supported on the carrier at one end and with rollers alternately establishing a contact with said half-ring and the stationary guide at the other.

The mechanism for converting the oscillating motion into the rotary motion comprises free-wheeling clutches supported on a shaft held in the carrier, the axis of the shaft being perpendicular to the axis of the input and output shafts, connected through the spur gears of the carrier to the racks of the rods as well as to the differential pinions made in the form of bevel gears meshed with the central bevel wheel mounted on the output shaft.

As the input shaft and the associated carrier rotate, the rollers roll along the half-ring and the stationary guide to convert the rotary motion of the input shaft into the oscillating (reciprocating) motion of the rods connected thereto.

The amount of motion of the rods depends on the amount of displacement of the movable end of the half-ring relative the immovable end thereof.

The reciprocating motion of the rods through the associated spur gears of the carrier, the free-wheeling clutches and the differential pinions is converted into the rotary motion of the output shaft.

The output speed of rotation is adjusted by moving the movable end of the half-ring.

The above-described structure of the variable speed device provides for an extremely uniform rotation of the output shaft.

However the same structure has a relatively limited scope of speed control since it provides for a relatively narrow range of output speed control and only while increasing the speed relative the speed of rotation of the input shaft.

The reciprocating rods in the structure of the variable speed device predetermine high dynamic loads as the device operates and this limits considerably the maximum speed of rotation of the input shaft and thereby the scope of speed control in the same variable speed device is limited.

Also, in operation, the free-wheeling clutches rotate together with the carrier to thereby impose great centrifugal forces on them, which limit the service life of these free-wheeling clutches and thus the service life of the variable speed device as a whole.

The service life of the variable speed device is also limited by the fact that in operation the rollers of the rods, in contact with the half-ring and the stationary guide, at the zone of passing from the half-ring to the guide and in the reverse direction, change the sense of rotation and slip to produce wear in these rollers and the surfaces of the half-ring and the guide in contact with the rollers.

SUMMARY OF THE INVENTION

The invention is directed at the provision of an impulse variable speed device whose design provides for a considerable extension of the scope of speed control and service life, the uniformity of rotation of the output shaft being undeteriorated.

The above objective is attained by providing an impulse variable speed device comprising coaxially arranged input and output shafts, a mechanism for converting a rotary motion of the input shaft into an oscillating motion of an intermediate link kinematically connected to said input shaft, and a mechanism for converting the oscillating motion of the intermediate link into the rotary motion of the output shaft and having free-wheeling clutches kinematically connected with said intermediate link. According to the invention, the mechanism for converting the rotary motion into the oscillating motion is constructed with a bow-shaped guide rod fixed on the input shaft and having the center of curvature thereof on the axis of the input and output shafts, which center is a single center of the variable speed device; a slider put on said guide rod for displacement along said guide rod; and a lever whose axis crosses the single center of the variable speed device, one end of which is pivoted to the slider and the other end of which is fixed on the intermediate link serving as a carrier and capable of rocking with respect to the single center of the variable speed device. The carrier is a member of a mechanism for converting a rocking motion into a rotary motion, which mechanism being constructed as a converter having a single center, which coincides with the single center of the variable speed device.

Such an arrangement of the mechanism for converting the rotary motion of the input shaft into the rocking motion of the carrier makes it possible to expand the scope of speed control by the variable speed device.

By moving the slider along the bow-shaped guide it is possible to vary over a wide range the angle of inclination of the lever relative the axis of the input and output shafts and thereby to control over a wide range the output speed of rotation both while increasing and decreasing the same in relation to the speed of rotation of the input shaft. Also, the conversion of the rotary motion of the input shaft into the rocking motion of the carrier relative the single center of the variable speed device provides for elimination of high dynamic loads in operation, which is a factor that imposes limitations on the maximum speed of rotation of the input shaft to a lesser degree and thereby the scope of speed control is expanded.

The free-wheeling clutches in the above structure of the variable speed device together with the carrier produce only the rocking motion to considerably decrease centrifugal forces acting on the clutches and thereby the service life of the clutches and the variable speed device as a whole is extended.

Moreover, the exclusion from the device of the rods with the rollers contacting the half-ring and the stationary guide, also provides for a considerable increase in the service life of the variable speed device.

The mechanism for converting the rocking motion into the rotary motion constructed as a converter having a single center, which coincides with the single center of the variable speed device, makes it possible to convert a combined rocking motion of the carrier in two planes relative the single center of the converter into a uniform rotary motion of the output shaft.

In apparatus having a wide range of speed and torque control with a relatively low speed of rotation of the output shaft of the variable speed device, the latter is preferred of the type in which the converter having a single center is constructed as a bevel gear having two differential pinions mounted on the carrier through the free-wheeling clutches of a heterodirectional action and constantly in mesh with said differential pinions are two central wheels, each of which is mounted on the end of a half-axle through a free-wheeling clutch, said half-axles of the central wheels being coaxial and their axis being perpendicular to the axis of the input and output shafts. On the opposite end of each said half-axle there is secured a bevel wheel constantly in mesh with a bevel wheel secured on the output shaft. In this case, the axes of the differential pinions, the central wheels, and the three bevel wheels are perpendicular to each other and intersect at the center of the converter having a single center.

Such modification of the impulse variable speed device makes it possible to adjust the speed of rotation of the output shaft over a range from 0 to 2,000 rpm and may be used in feed drives of metal cutting tools, in drives for materials-handling equipment, etc.

A more rugged construction with a wider range of speed control is provided in a further modified variable speed device in which each differential pinion and each central wheel of the bevel gear are made in the form of two diametrically opposed sectors, the sectors of the differential pinions are constantly in mesh with the corresponding sectors of the central wheels and are secured on the carrier, while the sectors are secured in pairs, diametrically opposed, and symmetrical with respect to the axis of the input and output shafts on each of two coaxial shafts whose axis is extending through the center of the converter having a single center and is perpendicular to the axis of the input and output shafts. In this case, the ends of said coaxial shafts carry free-wheeling clutches of a heterodirectional action and connecting these shafts with the bevel wheels.

Such an arrangement of the converter having a single center provides for the adjustment of the speed of rotation of the output shaft over a range from 0 to 4,500 rpm.

Simpler to construct and less noise-producing in operation is a modification of the impulse variable speed device in which each of the coaxial shafts carry pairs of coaxial gudgeons arranged at an angle to the axis of said shafts and the carrier is made in the form of a ring pivoted to the gudgeons of the outer coaxial shaft and having coaxial gudgeons pivoted to an intermediate ring, which in turn is pivoted to the gudgeons of the inner coaxial shaft. In this case, the axes of the gudgeons intersect while the centers of the carrier and of the intermediate ring coincide with the single center of the converter.

This modification of the impulse variable speed device may be used in machine tools having a speed control range of the output shaft from 0 to 4,500 rpm, it may also be used in cars, tractors, etc.

It is preferred that the outer coaxial shaft be made in the form of two coaxial bosses connected by two half-rings, each of which has a gudgeon pivoted to the carrier. In this case, the centers of said half-ring coincide while the axes of the gedgeons are coaxial and pass the single center of the converter.

Such a modification of the impulse variable speed device has the most stable characteristics of the gear ratio, is simpler in construction, and may be used in apparatus having a speed control range of the output shaft from 0 to 4,500 rpm.

The simplest modification to construct and which has the most uniform rotation of the output shaft is a modification of the novel impulse variable speed device in which the converter having a single center is constructed as an axle immovably secured and extending through the single center of the variable speed device serving as a support having free-wheeling clutches arranged in series on the shaft, as a ring having two diametrically opposed coaxial gudgeons and mounted for rotation about said axle, as a carrier made in the form of a fork having two diametrically opposed bow-shaped rods, each of which has in its middle portion a lug pivoted to a respective gudgeon of the ring, while on the ends it has gudgeons and four three-arm levers, two arms of each of the levers are correspondingly pivoted to one of the pairs of diametrically opposed gudgeons of the bow-shaped rods of the carrier while the third arm is pivoted to the levers of the free-wheeling clutches, in this case the axes of rocking of the ring, the carrier, the three-arm levers, and the free-wheeling clutches as well as the pivot axes of the pivot joits of the three-arm levers with the free-wheeling clutches respectively intersect in the center of the converter having a single center.

The fact that there is no gearing in the above modification of the novel variable speed device results in a minimum noise generation in operation. This modification of the impulse variable speed device may be used in apparatus with a 0 to 4,500 rpm range of the speed control of the output shaft.

BRIEF DESCRIPTION OF THE DRAWINGS

Now the invention is described by way of example of several embodiments thereof with reference to the accompanying drawings, in which.

DETAILED DESCRIPTION OF THE INVENTION

Figure 1:
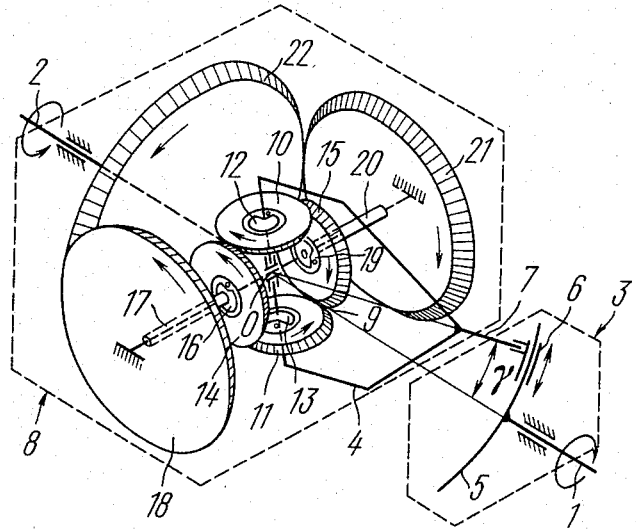
FIG. 1 is a diagrammatical view of an impulse variable speed device of the invention.

An impulse variable speed device comprises an input shaft 1 (see FIG. 1 of the accompanying drawings) and an output shaft 2 coaxially arranged with the shaft 1. The input shaft 1 is connected with a mechanism 3 for converting rotary motion of the input shaft 1 into a rocking motion of a carrier 4 connecting in turn the mechanism 3 with a mechanism for converting the rocking motion of the carrier 4 into a rotary motion of the output shaft 2. The mechanism 3 for converting the rotary motion of the input shaft 1 into the rocking motion of the carrier 4 in accordance with the invention comprises a bow-shaped guide rod 5 fixed on the input shaft 1. The center of curvature of the guide rod is on the axis of the input shaft 1 and of the output shaft 2 and is a single center of the variable speed device. A slider 6 is put on the guide rod 5 for displacement along the guide rod 5. The slider 6 is pivoted to one end of a lever 7 whose axis crosses the single center of the variable speed device. The other end of the lever 7 is fixed on the carrier 4.

The mechanism for converting the rocking motion of the carrier 4 into the rotary motion of the output shaft 2, in accordance with the invention, is made in the form of a converter 8 having a single center 0 which coincides with the single center of the variable speed device. In addition, the carrier 4 is a member of the converter 8 having a single center and is arranged for a rocking motion about the center 0 of the converter 8.

The converter 8 having a single center may be variously constructed.

In FIG. 1 of the accompanying drawings there is shown an impulse variable speed device of the invention providing for speed control of the output shaft 2 over a range of from 0 to 2,000 rpm. The converter 8 of the above variable speed device is constructed in the form of a bevel gear 9. The bevel gear 9 comprises two differential pinions 10 and 11 mounted on the carrier 4 through free-wheeling clutches of a heterodirectional action designated 12 and 13 respectively. Two central wheels 14 and 15 are constantly in mesh with the differential pinions 10 and 11. The central wheel 14 through a free-wheeling clutch 16 is mounted on the end of a half-axle 17 and on the opposite end of the half-axle there is a bevel wheel 18 rigidly secured thereto. The central wheel 15 through a free-wheeling clutch 19 is mounted on the end of a half-axle 20 and on the opposite end of the half-axle there is a bevel wheel 21 rigidly secured thereto. The half-axles 17 and 20 are arranged coaxially and their axis is perpendicular to the axis of the input and output shafts 1 and 2. The bevel wheels 18 and 21 are constantly in mesh with a bevel wheel 22 mounted on the output shaft 2.

The axes of the differential pinions 10 and 11, the central wheels 14 and 15, the half-axles 17 and 20, as well as of the three bevel wheels 18, 21, and 22 are perpendicular to each other and intersect at the center 0 of the converter 8 having a single center.

Figure 2:
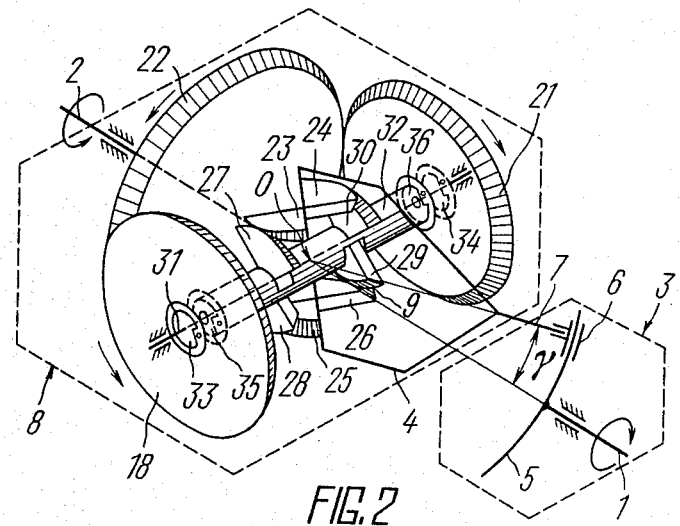
FIG. 2 is a diagrammatical view of a modified impulse variable speed device of the invention, wherein the converter having a single center comprises differential pinions and central wheels made as diametrically opposed sectors.
Figure 3:
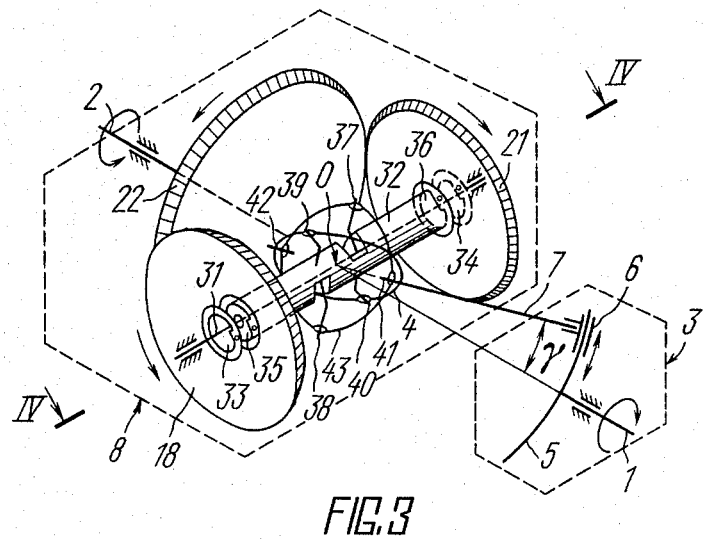
FIG. 3 is a diagrammatical view of a modified impulse variable speed device of the invention, wherein the converter having a single center comprises gudgeons secured on coaxial shafts.
Figure 7:
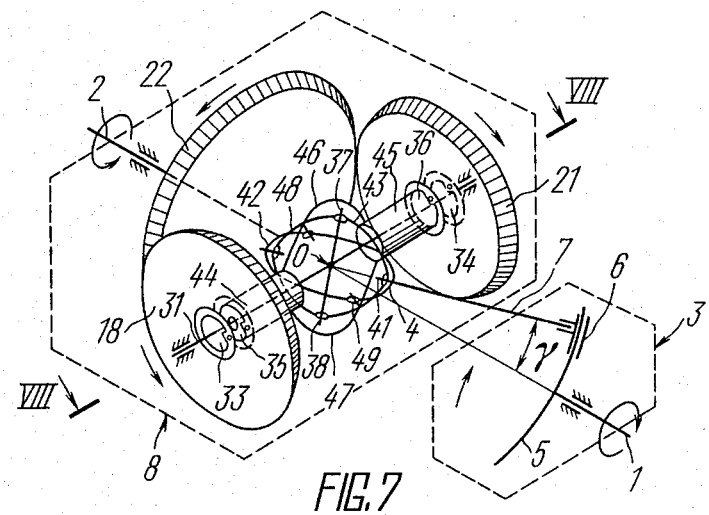
FIG. 7 is a diagrammatical view of a modified impulse variable speed device of the invention, wherein the converter having a single center comprises an outer coaxial shaft made in the form of two bosses with half-rings.
Figures 4, 5, 6:
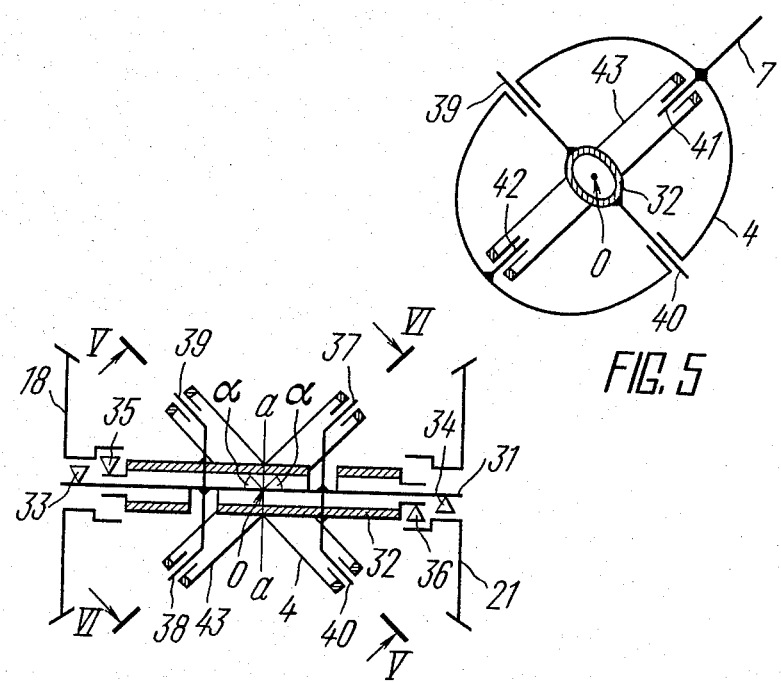
FIG. 4 is a sectional view of a modified form of the converter having a single center taken along the line IV—IV in FIG. 3 of the accompanying drawings.
FIG. 5 is a sectional view of a modified form of the converter having a single center taken along the line V—V in FIG. 4 of the accompanying drawings.
FIG. 6 is a sectional view of a modified form of the converter having a single center taken along the line VI—VI in FIG. 4 of the accompanying drawings.
Figure 9:
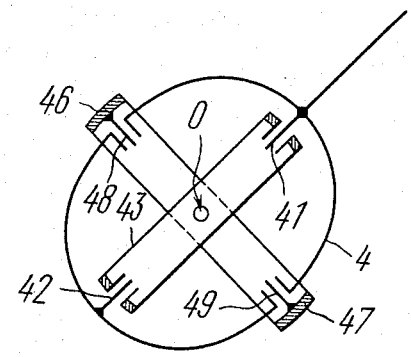
FIG. 9 is a sectional view of a modified form of the converter having a single center taken along the line IX—IX in FIG. 8 of the accompanying drawings.
Figure 8:
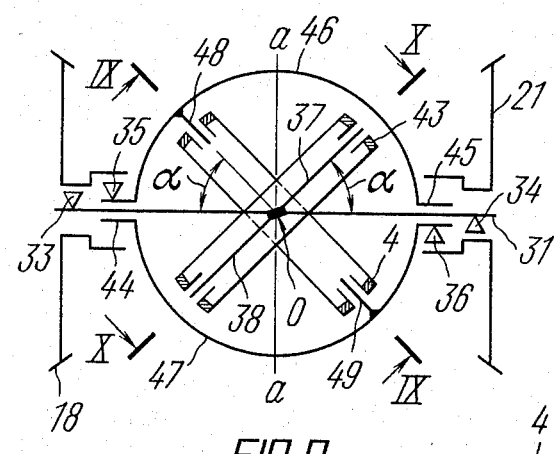
FIG. 8 is a sectional view of a modified form of the converter having a single center taken along the line VIII—VIII in FIG. 7 of the accompanying drawings.
Figure 10:
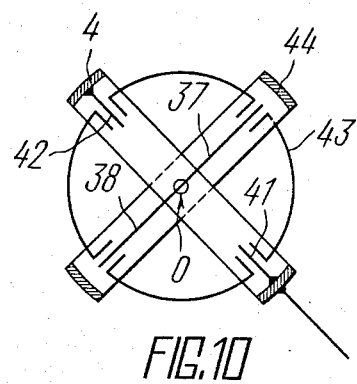
FIG. 10 is a sectional view of a modified form of the converter having a single center taken along the line X—X in FIG. 8 of the accompanying drawings.

FIG. 2 of the accompanying drawings shows a modified impulse variable speed device providing for the adjustment of the speed of rotation of the output shaft 2 over a range of from 0 to 4,500 rpm.

In this modified variable speed device the converter 8 having a single center is constructed as follows. Each differential pinion 10 and 11 of the bevel gear 9 is made in the form of two diametrically opposed sectors designated 23, 24 and 25, 26 respectively, which are rigidly secured on the carrier 4. Each central wheel 14 and 15 of the bevel gear 9 is also made in the form of two diametrically opposed sectors 27, 28 and 29, 30 respectively. Besides, the two sectors 27 and 29 of the central wheels 14 and 15 respectively are fixed on an inner shaft 31 so that they are diametrically opposite and symmetrical relative the axis of the input and output shafts 1 and 2, while the two sectors 28 and 30 of the central wheels 14 and 15 respectively are fixed on an outer shaft 32 so that they are diametrically opposite and symmetrical relative the axis of the input and output shafts 1 and 2. The outer shaft 32 and the inner shaft 31 are arranged coaxially and their axis is extending through the center 0 of the converter 8 having a single center and is perpendicular to the axis of the input and output shafts 1 and 2.

The sectors 23 and 24 of the differential pinion 10 are constantly in mesh with the sectors 27 and 30 respectively of the central wheels 14 and 15 respectively. The sectors 25 and 26 of the differential pinion 11 are constantly in mesh with the sectors 28 and 29 respectively of the central wheels 14 and 15 respectively.

Free-wheeling clutches 33 and 34 of a heterodirectional action are mounted on the end portions of the inner shaft 31 to connect the inner shaft 31 with the bevel wheels 18 and 21 respectively. Free-wheeling clutches 35 and 36 of a heterodirectional action are mounted on the end portions of the outer shaft 32 to connect the outer shaft 32 with the bevel wheels 18 and 21 respectively.

In FIGS. 3, 4, 5, and 6 of the accompanying drawings there is shown a modified form of the impulse variable speed device of the invention which is simpler to construct and less noise producing in operation. This modification may be used in machine tools having a speed control range of the output shaft from 0 to 4,500 rpm, it may also be used in cars, tractors, etc.

In this modification of the impulse variable speed device the converter 8 having a single center is constructed as follows. The inner shaft 31 carries two coaxial gudgeons 37 and 38 arranged at an angle $\alpha$ to the axis of the same shaft 31 and the outer shaft 32 carries two coaxial gudgeons 39 and 40 also arranged at an angle $\alpha$ to the axis of the shaft 32 which is axially aligned with the shaft 31.

The angle $\alpha$ depends on the maximum angle $\gamma_{max}$, at which the lever 7 is inclined to the axis of the input and output shafts 1 and 2, and is determined by the following relation:

$$\alpha = \tan^{-1}\left(\frac{1}{\cos \gamma_{max}}\right).$$

The carrier 4 has the form of a ring pivoted to the gudgeons 39 and 40 of the outer coaxial shaft 32. The carrier 4 has two coaxial gudgeons 41 and 42 which are pivoted to an intermediate ring 43. The intermediate ring 43 in turn is pivoted to the gudgeons 37 and 38 of the inner coaxial shaft 31.

Besides, the axes of the gedgeons 37, 38, 39, 40 intersect each other and the centers of the carrier 4 and of the intermediate ring 43 coincide with the center 0 of the converter 8 having a single center.

FIGS. 7, 8, 9, and 10 of the accompanying drawings show a modified form of the novel impulse variable speed device characterized by more stable speed ratios and which is simpler in construction. This modification may also be used in apparatus having a speed control range of the output shaft 2 from 0 to 4,500 rpm.

In this modification of the impulse variable speed device the converter 8 having a single center is substantially of the same construction as shown in FIGS. 3, 4, 5, and 6 of the accompanying drawings. However, the outer coaxial shaft 32 is made in the form of two coaxial bosses 44 and 45 coupled by half-rings 46 and 47. The half-ring 46 has a gudgeon 48 while the half-ring 47 has a gudgeon 49. The gudgeons 48 and 49 are coaxial, they are arranged at an angle $\alpha$ to the axis of the shaft 32, and are pivoted to the carrier 4. In addition, the axes of the gudgeons 37, 38, 48, and 49 intersect each other while the centers of the half-rings 46 and 47 coincide with the center 0 of the converter 8.

Figure 11:
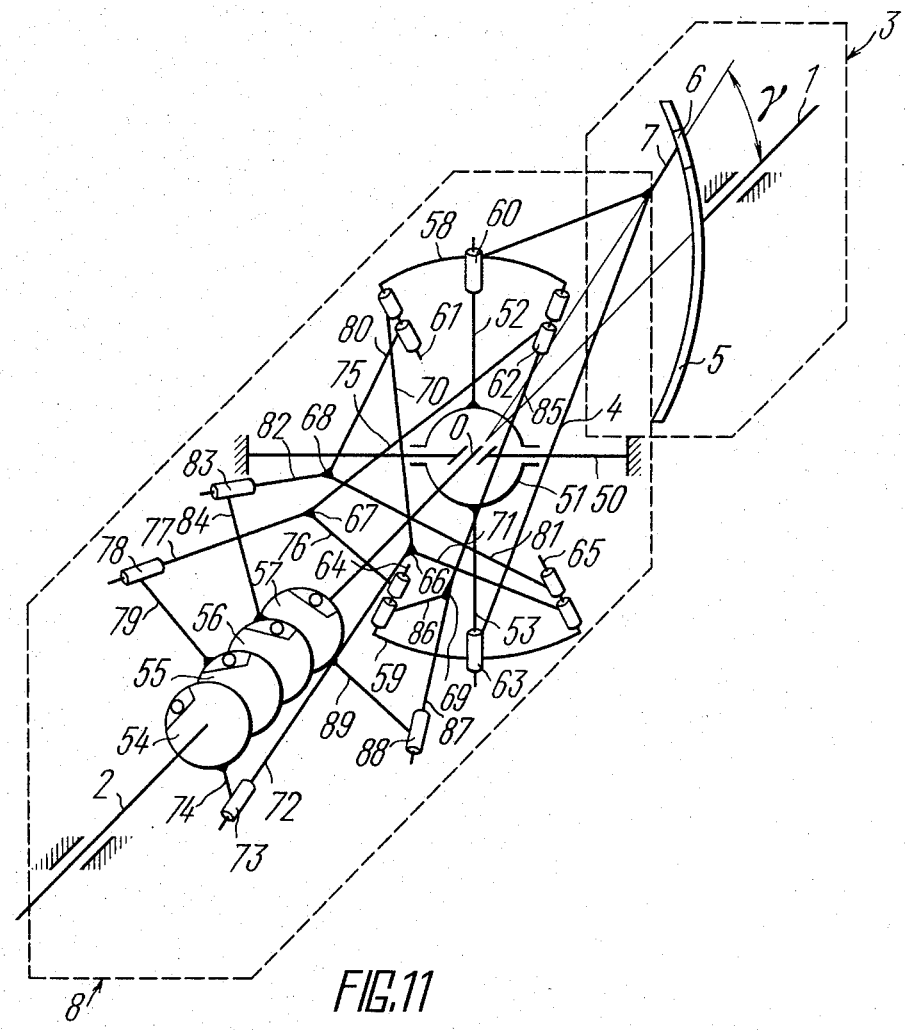
FIG. 11 is a diagrammatical view of a modified impulse variable speed device of the invention, wherein the converter having a single center comprises three-arm levers.

In FIG. 11 of the accompanying drawings there is shown a further modified impulse variable speed device of the invention which is the simplest to construct and provides the most uniform rotation of the output shaft 2.

In this modification of the impulse variable speed device the converter 8 having a single center is constructed as follows.

The converter 8 having a single center comprises a stationary axle 50 which provides support for one of the ends of the output shaft 2. The axle 50 carries a ring 51 adapted for rotation about the axle and having two diametrically opposed coaxial gudgeons 52 and 53. On the output shaft 2 there are free-wheeling clutches 54, 55, 56, and 57 arranged in series. The carrier 4 has the form of a fork with two diametrically opposite bow-shaped rods 58 and 59. The bow-shaped rod 58 in its middle portion is provided with a lug 60 pivotally connected with the gudgeon 52 of the ring 51 while the ends of rod 58 are provided with gudgeons 61 and 62.

The bow-shaped rod 59 in its middle portion is provided with a lug 63 pivotally connected to the gudgeon 53 of the ring 51 while the ends of the rod 59 are provided with gudgeons 64 and 65. Also, the converter having a single center comprises four three-arm levers 66, 67, 68, and 69. The arms 70 and 71 of the three-arm lever 66 are pivoted to the corresponding gudgeons 61 and 65 of the bow-shaped rods 58 and 59 while the arm 72 of the three-arm lever 66 is connected through a pivot joint 72 with a lever 74 of the free-wheeling clutch 54. The arms 75 and 76 of the three-arm lever 67 are pivoted to the corresponding gudgeons 62 and 64 of the bow-shaped rods 58 and 59 while the arm 77 of the three-arm lever 67 is connected through a pivot joint 78 with a lever 79 of the free-wheeling clutch 55. The arms 80 and 81 of the three-arm lever 68 are pivoted to the corresponding gudgeons 61 and 65 of the bow-shaped rods 58 and 59 while the arm 82 of the three-arm lever 68 is connected through a pivot joint 83 with a lever 84 of the free-wheeling clutch 56. The arms 85 and 86 of the three-arm lever 69 are pivoted to the corresponding gudgeons 62 and 64 of the bow-shaped rods 58 and 59 while the arm 87 of the three-arm lever 69 is connected through a pivot joint 88 with a lever 89 of the free-wheeling clutch 57.

Moreover, the axes of the pivot joints 73, 78, 83, and 88 connecting the respective arms 72, 77, 82, 87 of the three-arm levers 66, 67, 68, 69 with the levers 74, 79, 84, 89 of the free-wheeling clutches 54, 55, 56, 57 respectively intersect each other at the center 0 of the converter 8 having a single center. The axes of rocking of the ring 51, the carrier 4, the three-arm levers 66, 67, 68, 69, and the free-wheeling clutches 54, 55, 56, 57 also intersect each other at the center 0 of the converter 8 having a single center.

The above described impulse variable speed device operates as follows.

First, the slider 6 (see FIG. 1 of the accompanying drawings) is adjusted on the guide rod 5 so that the axis of the lever 7 is set at an angle $\gamma$ to the axis of the input and output shafts 1 and 2. As the input shaft 1 rotates so does the guide rod 5 together with the slider 6 and the lever 7. In doing this, the lever 7 generates a conical surface with an apex at the center 0 of the converter 8 having a single center. This motion of the lever 7 induces the carrier 4 to rock about two axes which are perpendicular to each other: the carrier 4 rocks about the axis of the differential pinions 10 and 11, and the carrier 4 together with the differential pinions 10 and 11 rocks about the axis of the half-axles 17 and 20. The amplitude of oscillating motion of the carrier 4 about the above mentioned axes makes an angle equal $2\gamma$.

The rocking motion of the carrier 4 about the axis of the differential pinions 10 and 11 through free-wheeling clutches 12 and 13 of a heterodirectional action is transmitted to the differential pinions 10 and 11 and farther on to the central wheels 14 and 15. A simultaneous rocking motion of the carrier 4 together with the differential pinions 10 and 11 about the axis of the half-axles 17 and 20 produces an added rocking motion of the central wheels 14 and 15.

The sum of the rocking motions of the central wheels 14 and 15 about the axis of the half-axles 17 and 20 through the free-wheeling clutches 16 and 19 of a heterodirectional action is transmitted to the corresponding bevel wheels 18 and 21. Rotation of the bevel wheels 18 and 21 by turns and in different directions causes a unidirectional uniform rotation of the bevel wheel 22 and, consequently, of the output shaft 2.

The speed of rotation of the output shaft 2 is controlled by varying the amplitude of oscillation of the carrier 4 through the movement of the slider 6 along the guide rod 5.

The modified form of the impulse variable speed device shown in FIG. 2 of the accompanying drawings operates in much the same way as has been described above. However, when the input shaft 1 rotates, the rotary motion thereof is converted into the rocking motion of the carrier 4 about the next two axes perpendicular to one another: the carrier 4 rocks about the axis of rotation of the sectors 23, 24, 25, and 26, and the carrier 4 together with the sectors 23, 24, 25, and 26 rocks about the axis of the coaxial shafts 31 and 32.

The rocking motion of the carrier 4 about the axis of rotation of the sectors 23, 24, 25, and 26 respectively and the rocking motion of the sectors 23, 24, 25, and 26 is transmitted to the sectors 27 and 30 of the inner shaft 31 and to the sectors 28 and 29 of the outer shaft 32. At the same time, rocking of the carrier 4 together with the sectors 23, 24, 25, and 26 about the axis of the coaxial shafts 31 and 32 causes an added rocking motion of the sectors 27 and 30 of the inner shaft 31 and of the sectors 28 and 29 of the outer shaft 32.

The sum of the rocking motions of the sectors 27 and 30 through the inner shaft 31 and the free-wheeling clutches 33 and 34 of a heterodirectional action is transmitted to the bevel wheels 18 and 21 respectively. The sum of the rocking motions of the sectors 28 and 29 through the outer shaft 32 and the free-wheeling clutches 35 and 36 of a heterodirectional action is transmitted to the bevel wheels 18 and 21 respectively. Rotation of the bevel wheels 18 and 21 in different directions causes a unidirectional uniform rotation of the bevel wheel 22 and the output shaft 2.

The modified form of the impulse variable speed device shown in FIGS. 3, 4, 5, and 6 of the accompanying drawings operates in much the same way as has been described above. However, when the input shaft 1 rotates, the rotary motion thereof is converted into the rocking motion of the carrier 4 about the two axes perpendicular to each other: the carrier 4 oscillates about the axis of the coaxial shaft 31 and 32 as well as about the axis a—a.

The rocking motion of the carrier 4 about the axis of rotation of the coaxial shafts 31 and 32 through the intermediate ring 43 is transmitted to the coaxial shafts 31 and 32. As this takes place the amplitude and direction of the rocking motion of the carrier 4 and the coaxial shafts 31 and 32 are equal.

The rocking motion of the carrier 4 about the axis a—a through the intermediate ring 43 is also transmitted to the coaxial shafts 31 and 32. But here directions of the rocking motions of the inner and the outer shafts 31 and 32 are opposite.

The sum of the rocking motions of the inner shaft 31 through the free-wheeling clutches 33 and 34 of a heterodirectional action is transmitted to the bevel wheels 18 and 21 while the sum of the rocking motions of the outer shaft 32 through the free-wheeling clutches 35 and 36 of a heterodirectional action is transmitted to the bevel wheels 18 and 21. Rotation of the bevel wheels 18 and 21 in different directions causes a unidirectional uniform motion of the bevel wheel 22 and the output shaft 2.

The modified form of the impulse variable speed device shown in FIGS. 7, 8, 9, and 10 of the accompanying drawings operates in much the same way as the one previously described. However, when the rocking motion of the carrier 4 is converted into a heterodirectional rotation of bevel wheels 18 and 21 by transmitting the rocking motion of the carrier 4 through the intermediate ring 43 and the half-rings 46 and 47 onto the inner shaft 31 and the bosses 44 and 45 coaxial with the latter and further on through the free-wheeling clutches 33, 34, 35, and 36 of a heterodirectional action, the motion is transmitted to the bevel wheels 18 and 21.

The modified form of the impulse variable speed device shown in FIG. 11 of the accompanying drawings operates as follows.

As the input shaft 1 rotates, the rotary motion is converted into the rocking motion of the carrier 4 about two interperpendicular axes: the carrier 4 rocks about the axes 50 as well as about the axis of the coaxial gudgeons 52 and 53.

The sum of the rocking motions of the carrier 4 about the two interperpendicular axes is transmitted through the three-arm levers 66, 67, 68, and 69 to the free-wheeling clutches 54, 55, 56, and 57 respectively. The clutches 54, 55, 56, and 57 convert the sum of the rocking motion of the three-arm levers 66, 67, 68, and 69 into a unidirectional uniform rotation of the output shaft 2.

INDUSTRIAL APPLICABILITY

The present invention may prove most advantageous in mechanical engineering as part of machine tools, in automobiles, tractors and some other mechanisms wherein the speed of rotation of the output shaft is necessary.

We claim:

1. An impulse variable speed device comprising coaxially arranged input and output shafts, a first mechanism converting rotary motion of the input shaft into oscillating motion of an intermediate link and kinematically connected to said input shaft, and a second mechanism converting the oscillating motion of the intermediate link into rotary motion of the output shaft and having free-wheeling clutches kinematically connected with said intermediate link, wherein the improvement comprises (a) the first mechanism comprising (1) a bow-shaped guide rod fixed on the input shaft and having a center of curvature on the axis of the input and output shafts, which center is a single center of the variable speed device; (2) a slider put on said guide rod for displacement along said guide rod; and (3) a lever whose axis crosses the single center of the variable speed device, one end of said lever being pivoted to the slider and another end of said lever being fixed on the intermediate link; (b) said intermediate link comprising a carrier capable of rocking with respect to the single center of the variable speed device; and (c) said second mechanism comprising a converter having a single center, which coincides with the single center of the variable speed device; wherein the converter comprises a bevel gear having two differential pinions mounted on the carrier through free-wheeling clutches of a heterodirectional action constantly in mesh with said differential pinions, two central wheels each of which is mounted on the end of a respective half-axle through a respective free-wheeling clutch, said half-axles of the central wheels being coaxial and their axis being perpendicular to the axis of the input and output shafts, on the opposite end of each said half-axles there is secured a bevel wheel constantly in mesh with a bevel wheel secured on the output shaft, the axes of the differential pinions, the central wheels, and the three bevel wheels being perpendicular to each other and intersecting at the center of the converter.

2. An impulse variable speed device as claimed in claim 1, wherein each differential pinion and each central wheel of the bevel gear are made in the form of two diametrically opposed sectors, the sectors of the differential pinions being constantly in mesh with the corresponding sectors of the central wheels and are secured on the carrier, the sectors of the central wheels being secured in pairs, diametrically opposed and symmetrical with respect to the axis of the input and output shafts on inner and outer coaxial shafts whose axis is extending through the center of the converter and is perpendicular to the axis of the input and output shafts, the ends of said coaxial shafts carry free-wheeling clutches of a heterodirectional action and connecting these shafts with the bevel wheels.

3. An impulse variable speed device as claimed in claim 2, wherein each of the coaxial shafts carry pairs of coaxial gudgeons arranged at an angle to the axis of said coaxial shafts, and the carrier comprises a ring pivoted to the gudgeons of the outer coaxial shaft; and having coaxial gudgeons pivoted to an intermediate ring, which in turn is pivoted to the gudgeons of the inner coaxial shaft, the axes of the gudgeons intersecting and the centers of the carrier and the intermediate ring coinciding with the single center of the converter.

4. An impulse variable speed device as claimed in claim 3, wherein the outer coaxial shaft is made in the form of two coaxial bosses connected by two half-rings, each of said half-rings has a gudgeon pivoted to the carrier, the centers of said half-rings coinciding and the axes of the gudgeons being coaxial and cut the single center of the converter.

5. An impulse variable speed device comprising coaxially arranged input and output shafts, a first mechanism converting rotary motion of the input shaft into oscillating motion of an intermediate link and kinematically connected to said input shaft, and a second mechanism converting the oscillating motion of the intermediate link into rotary motion of the output shaft and having free-wheeling clutches kinematically connected with said intermediate link, wherein the improvement comprises (a) the first mechanism comprising (1) a bow-shaped guide rod fixed on the input shaft and having a center of curvature on the axis of the input and output shafts, which center is a single center of the variable speed device; (2) a slider put on said guide rod for displacement along said guide rod; and (3) a lever whose axis crosses the single center of the variable speed device, one end of said lever being pivoted to the slider and another end of said lever being fixed on the intermediate link; (b) said intermediate link comprising a carrier capable of rocking with respect to the single center of the variable speed device; and (c) said second mechanism comprising a converter having a single center, which coincides with the single center of the variable speed device; wherein the converter comprises an axle immovably secured and extending through the single center of the variable speed device, serving as a support member for one of the ends of the output shaft and having free-wheeling clutches arranged in series on the shaft; a ring having two diametrically opposed coaxial gudgeons and mounted for rotation about said axle; said carrier made in the form of a fork having two diametrically opposed bow-shaped rods, each of which has in its middle portion a lug pivoted to a respective gudgeon of the ring while on the ends has gudgeons; and four three-arm levers, two arms of each of them correspondingly pivoted to one of the pairs of diametrically opposed gudgeons or bow-shaped rods of the carrier, the third arm being pivoted to the levers of the respective free-wheeling clutches, the axes of rocking of the ring, the carrier, the three-arm levers, and the free-wheeling clutches and the pivot axes of the pivot joints of the three-arm levers with the free-wheeling clutches respectively intersect at the center of the converter.

* * * * *